United States Patent
Thibaut

[11] Patent Number: 5,478,271
[45] Date of Patent: Dec. 26, 1995

[54] MILLING, SURFACING AND POLISHING MACHINE WITH AUTOMATIC TOOL CHANGE AND CORRESPONDING DEVICE

[75] Inventor: Bernard Thibaut, Vire, France

[73] Assignee: Thibaut S.A., Vire, France

[21] Appl. No.: 120,540

[22] Filed: Sep. 14, 1993

[30] Foreign Application Priority Data

Sep. 18, 1992 [FR] France ................... 92 11141

[51] Int. Cl.⁶ ..................................... B24B 41/00
[52] U.S. Cl. ................... 451/342; 483/33; 483/54
[58] Field of Search .................. 451/342; 483/33, 483/54

[56] References Cited

U.S. PATENT DOCUMENTS

| | | | |
|---|---|---|---|
| Re. 33,335 | 9/1990 | Gentischer et al. | 451/342 |
| 2,747,343 | 5/1956 | Gellert | 451/342 |
| 3,656,393 | 4/1972 | Goellner | 451/342 |
| 4,551,902 | 11/1985 | Thibaut | 451/342 |
| 4,700,453 | 10/1987 | Strate et al. | 451/342 |

FOREIGN PATENT DOCUMENTS

| | | |
|---|---|---|
| 0074452 | 3/1983 | European Pat. Off. . |
| 2107710 | 5/1972 | France . |

*Primary Examiner*—Robert A. Rose
*Attorney, Agent, or Firm*—Young & Thompson

[57] ABSTRACT

A milling, surfacing and polishing machine with automatic tool change comprises tool fastening and tightening means and tool drive means.

9 Claims, 3 Drawing Sheets

MILLING, SURFACING AND POLISHING MACHINE WITH AUTOMATIC TOOL CHANGE AND CORRESPONDING DEVICE

BACKGROUND OF THE INVENTION

1. Field of the Invention

This invention relates to a milling, surfacing and polishing machine with automatic tool change, and to a corresponding tool changing device.

The invention is particularly intended for the milling, polishing and surfacing of natural or agglomerated stones, blocks of concrete, granite, marble and like materials.

2. Description of the Prior Art

There are known surfacing and polishing machines with automatic tool change, e.g. of the type marketed by THIBAUT, a company incorporated under French law, under the name "T555".

In this type of machine, the coupling of the tool is performed in the central position co-axial with the axis of rotation of the tool by means of a part called "tightening chuck" serving to tighten and eject rods with slightly tapered cones into a spindle head by means of a fastening bolt, while the positioning of the tool is carried out by the cooperating of studs fixed to the spindle head and sockets fixed to the tool.

In these known machines, the central coupling part is not visible and is rotatably driven simultaneously with the tool: this arrangement does not enable external supervision of the coupling of a tool being rotated and enlarges the spindle shaft to maintain central sprinkling.

European patent application No. 0,074,452 describes an improvement to milling heads comprising a body in which a tool-holding spindle is rotatably mounted. In the milling head body, there is mounted, rotatably and axially sliding under the action of control elements, a sleeve in which the spindle is rotatably mounted. Said sleeve comprises bayonet-type locking elements cooperating with corresponding locking elements provided on the body of an accessory.

Said body has, on its front at its periphery and outside of the sleeve, positioning and centering means susceptible of being engaged with the corresponding means provided at the periphery of the body of the accessory.

This known structure intended for the machining of metals does not have the mechanical strength required for the processing of stones and like materials, is prone to soiling and does not enable permanent supervision of the satisfactory coupling of the tool, due to the fact that the fastening means are radially internal to the assembly comprised by the spindle and the tool-holder.

French patent application No. 2,107,710 describes an automatic tool-holder replacing and aligning device, notably for milling heads with countersink on the milling carriage of a machine-tool. In this device, the fastening means are radially interior and cannot be permanently supervised. Furthermore, the fastening by screwing into a threaded central tube prone to soiling does not enable the utilisation of this device to be envisaged for the processing of stones and like materials.

OBJECT OF THE INVENTION

The main object of this invention is to remedy the disadvantages of the known prior art, by creating a new machine and a new automatic tool-changing device enabling the satisfactory coupling of the tool to be permanently supervised.

SUMMARY OF THE INVENTION

Accordingly, an object of the invention is to provide a milling, surfacing and polishing machine with automatic tool change, of the type comprising a drive spindle for driving a tool according to or about an axis, characterized in that the machine comprises fastening and tightening means situated radially externally from the axis in relation to the drive means transmitting motion from the spindle to the tool, and in that the machine comprises immobilizing and centering means situated in a radially intermediate position, between said drive means and said tightening means, and in that the fastening and tightening means are conformed to lift the tool towards the spindle during tightening by bearing up under a corresponding conformation of the tool.

According to further features of the invention:

the drive spindle is a rotational drive spindle and the (rotational) drive means comprises positive clutch wheels, the machine comprises a successive command of the above-mentioned means capable of translationally approaching the spindle according to said axis for centering and immobilizing, then for the meshing of the drive means, then for fastening and tightening the tool.

A further object of the invention is to provide an automatic tool changing device for milling, surfacing and polishing machines, comprising a first element fixed to the tool-holding spindle, a second element permanently fixed to the sliding block, and a third fastening and tightening element fixed to the tool destined to be mounted onto the sliding block, in which is rotatably mounted a driving element of the tool, wherein the second and third elements respectively fixed to the sliding block and the tool comprise a hydraulic tightening means engaging and bearing up under a corresponding conformation of the tool, and wherein the fastening and tightening third element fixed to the tool comprises at least two centering pins or raised conformations, and an outer flange or conformation for tightening purposes.

According to further features of the invention:

the fastening and tightening element fixed to the tool comprises three centering pins or raised conformations, so as to achieve a plane-to-plane type contact and perfect sustaining during tightening;

the first element fixed to the tool-holding spindle and the driving element of the tool are hollow so as to enable a hydraulic fluid to pass through;

the first element fixed to the tool-holding spindle comprises a positive clutch wheel, and the driving element of the tool comprises a positive clutch gear of cooperating shape.

BRIEF DESCRIPTION OF THE DRAWINGS

Further features of the invention will be more apparent to those skilled in the art upon consideration of the following particular description, provided by way of a non-limiting example, in reference to the accompanying drawings in which.

DESCRIPTION OF THE PREFERRED EMBODIMENTS

Figure 1:
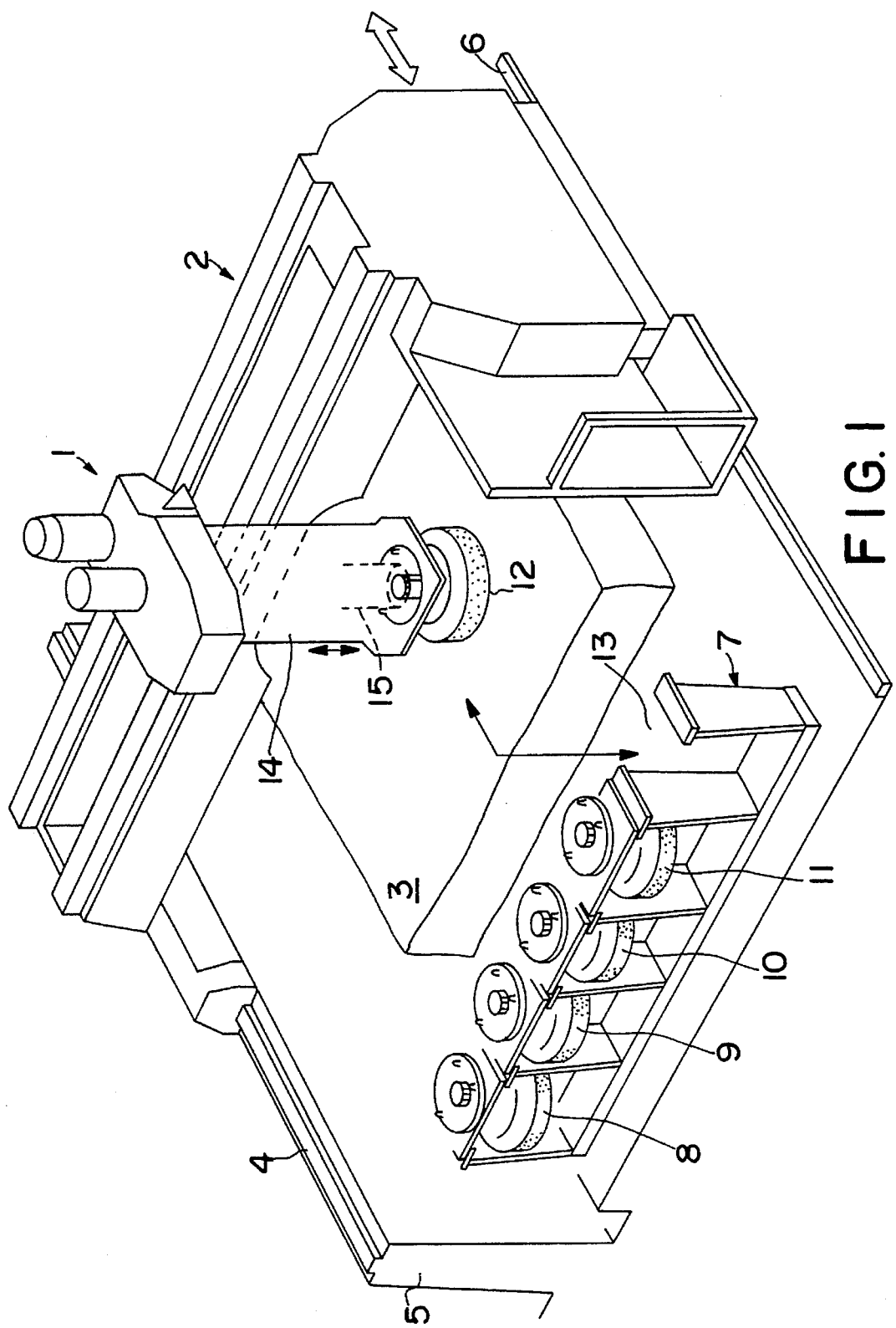
FIG. 1 schematically represents a perspective view of a machine according to the invention.

In reference to FIG. 1, a milling, surfacing or polishing machine according to the invention comprises a tool-holding carriage 1 moving along a beam 2 over the stone working area 3 and moving along a raised path comprised of a rail 4 fixed on a low wall 5 and on a second rail 6 or similar runway situated at floor level.

Generally, the beam 2 is driven on the raised rail 4 by a known drive means, e.g. of the pinion and rack type.

At one end of the working area, a storage magazine 7 bearing tools 8, 9, 10, 11 and comprising e.g. five spaces for tools, such as e.g. abrasive wheels of different grain size.

The machine, equipped with a tool 12 fitted with one or more polishing wheels, performs the polishing operation on the block 3, then, by way of the beam and carriage motion along the two horizontal translational axes of the machine, positions the carriage 1 vertically above the free area 13.

Then, by lowering through the vertical translation of the sliding block 14, the tool-holding spindle 15 descends substantially until the tool 12 comes into contact with the area 13.

The opening of the device according to the invention enables the tool 12 to be freed at its area 13.

The rising of the sliding block 14 and of the tool-holding spindle 15 and the translation of the carriage to position the tool-holding spindle 15 above a subsequent tool, e.g. tool 8, then enables the device according to the invention to be closed after the following steps:

the sliding block 14 is slowly lowered so as to enable the tool 8 to be centered with regard to the spindle 15 by way of means for positioning the device according to the invention situated, on the one hand, on the spindle 15, and, on the other hand, on the tool 8;

the sliding block 14 continues to be lowered until meshing or locking in of the drive means according to the invention situated, on the one hand, on the spindle 15, and, on the other hand, on the tool 8.

According to the invention, the coupling means are radially external to the drive means, particularly in the case of rotational drive.

Figure 2:
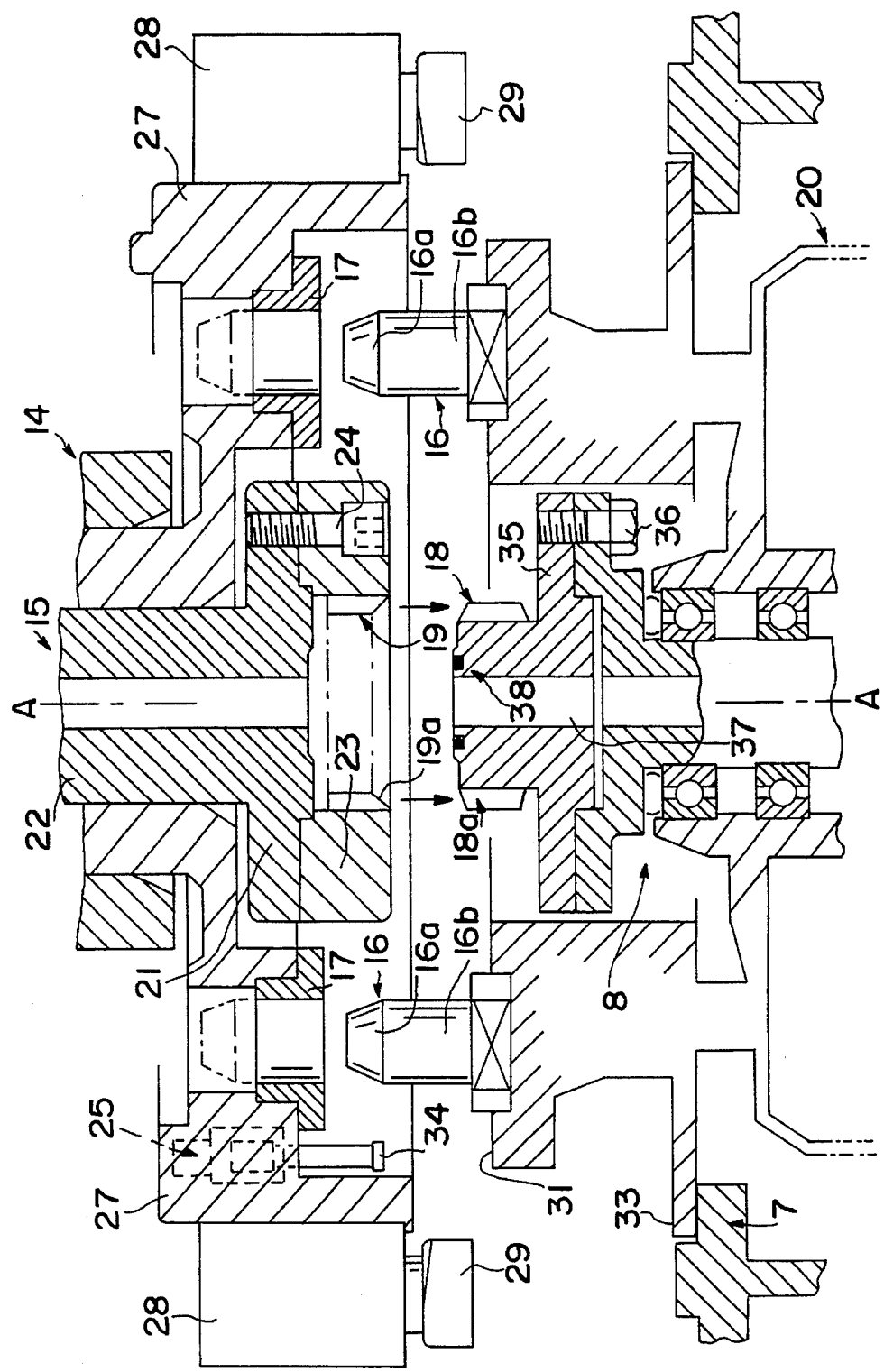
FIG. 2 schematically represents a diametral sectional drawing of a device according to the invention prior to coupling of the tool.
Figure 3:
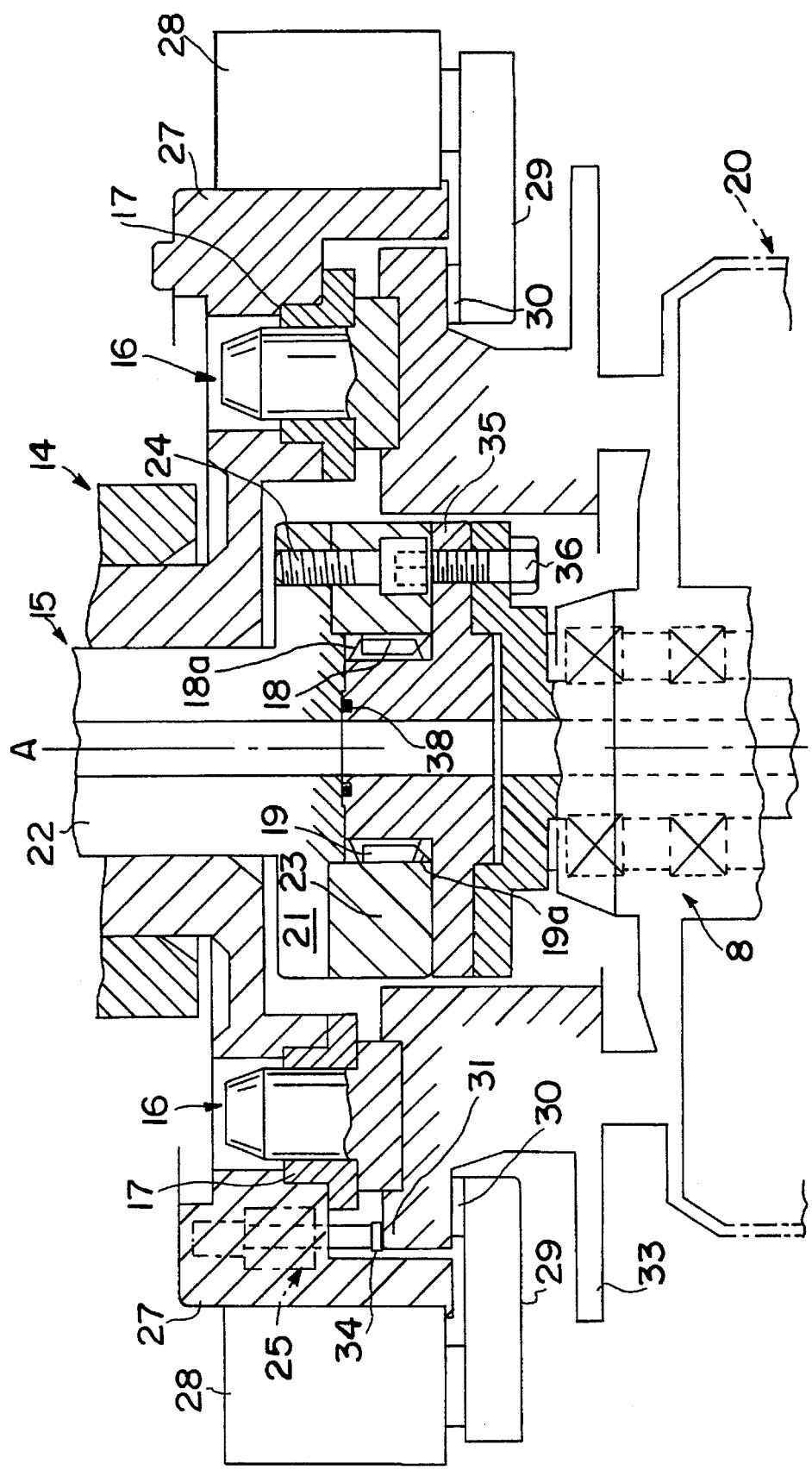
FIG. 3 schematically represents a diametral sectional drawing of a device according to the invention bearing a coupled tool.

In reference to FIGS. 2 and 3, an embodiment of a device according to the invention is substantially radially symmetrical in relation to the axis AA.

The positioning means comprise an assembly fixed to or part of the tool 8, comprising at least two centering pins 16 whose upper end 16a is truncated, and an assembly fixed to or part of the tool-holding spindle 15 comprising at least two sockets 17 screwed to or fixedly mounted onto the end of the sliding block 14 in such a way that, during the lowering of the sliding block 14, the centering of the tool 8 is automatically ensured by the engaging of the pins 16 into the sockets 17.

Preferably, the centering pins 16 are three in number and cooperate with three corresponding sockets 17 so as to achieve a plane-to-plane contacting and to obtain a perfectly balanced sustaining during tightening.

The rotational drive means comprise, on the tool 8 and tool-holding spindle 15, an outer positive clutch 18 and an inner positive clutch 19.

The teeth of the positive clutches 18 and 19 have relative meshing conformations and tooth camfers 18a and 19a bevelled so as to cause the pinion teeth to engage with those of the wheel by relation with the spindle.

Subsequent to the aligning and meshing of the two positive clutch wheels 18 and 19, the rotational motion about axis A—A is directly transmitted to the abrasive wheel 20 which constitutes the working part of the tool 8. The rotational drive function is thus totally independent of the centering function and of the coupling function of the device according to the invention.

The device according to the invention is an integral part of a machine according to the invention: consequently, this instance, the device and machine are studied simultaneously from the outset of the design stage.

However, the invention also advantageously relates to devices adaptable to existing machines in which the polishing of a surface is obtained by the passing of a given number of abrasive wheels (e.g. five) of different grain sizes mounted and removed manually in a predetermined order.

Thus, by adapting a device according to the invention, it is now possible to carry out an automatic tool change on machines of the prior art, e.g. on surfacing and polishing machines with manual attachment of tools manufactured under the name "T501" by THIBAUT, a company incorporated under French law.

For this purpose, on the lower flange 21 of the spindle shaft 22, there is mounted the wheel 23 fitted with an inner positive clutch by means of fastening screws 24, and a base 25 is also mounted on the lower part of the sliding block 14 by means of suitable screws.

The base 25 has three fixed centering sockets 17 cooperating with pins fixed to or part of the tool to be mounted, so as to immobilize and center the tool prior to tightening.

On the side of the base 25 and usually in a radially external position in relation to axis A—A, mounting blocks 27 are attached by screws to jacks or hydraulic tightening blocks 28 whose function comprises causing tightening means 29 to pivot a quarter turn between a first position substantially tangential to a cylinder of axis A—A and a second position substantially radial in relation to axis A—A.

The tightening means 29 are preferably thick elements each fitted with a circular lifting and sustaining block 30; these elements are fixed to or part of the rod of the jack 28 which rises, falls and pivots through 90°.

On the tool or abrasive wheel 8 of the prior art, an assembly is mounted comprising a fixed part that can be permanently fixed to the sliding block 14 and a part mounted rotatably on the central shaft of the tool capable of being driven by the spindle 21 shaft via positive clutch wheels 18 and 19.

The fixed part that can be permanently fixed to the sliding block 14 comprises a clamping flange 31 machined from a thick plate according to a circular or equivalent contour, a number of centering pins 16 corresponding to said centering sockets 17, and a lower flange 33 constituting a stop before contact with the tool and ensuring the sustaining in the corresponding area of the storage magazine 7.

A proximity detector 34 indicates the presence of a tool on the machine.

In the radially internal position, the tool 8 itself is rotatably mounted via a couple of bearings, an outer positive clutch pinion 35 being mounted on the upperface of said tool by means of protruding screws 36.

Advantageously, the spindle-holding shaft 21 and the tool 8 are internally hollow to enable considerable and well distributed central liquid flowing. According to the invention, the outer 23 and inner 35 positive clutch wheels are also hollow and comprise e.g. a central bore 37 for the passage of an abundant flow of hydraulic fluid. The central bore is surrounded by a suitable sealing ring 38, preferably placed on the outer positive clutch pinion 35.

By comparison with the known machines with automatic tool change and central attachment, the liquid flow rate is considerably higher and is not in any way reduced with regard to the manually attached machines of the prior art, while not necessitating any modification of the spindle shaft.

Furthermore, the large diameter of the positive clutch wheels 23 and 35 enables the transmission of high torques, in a much more efficient way than the one of the known machines of the prior art.

The operating method described in reference to FIG. 1 can, according to an advantageous alternative embodiment, comprise the following stage: after the vertical descent corresponding to the immobilizing and centering by cooperation of the pins 16 with the sockets 17, then with the meshing and locking of the inner 23 and outer 35 positive clutch wheels, a proximity detector 34 indicates the presence of a tool.

Upon detection, the hydraulic blocks 28 subjected to the hydraulic pressure cause the device to close and the tool 8 to be tightened to the machine by means of the lifting and sustaining elements 29 turning a quarter circle to a radially interior position, simultaneously lifting and tightening the tool 8 to the tool-holding spindle 21 and into the sockets 17 of the base 25.

The machine is then ready for operation and the securing of the tool is continually supervised by the inductive detector or presence indicator 34 so as to detect the presence of a tool on the machine.

The invention described for vertical spindle shaft machines also applies to all machines and tool storage magazines with an inclined or horizontal axis: the essential point is that, with these machines, the approach and fastening of the tool are performed by simple translation and then rotation of the fastening means radially external to the tool axis, these fastening means being conformed to lift the tool towards the spindle during tightening.

I claim:

1. A milling, surfacing and polishing machine with automatic tool change, comprising a drive spindle including drive means for driving a tool about an axis, fastening and tightening means situated radially externally from said axis in relation to the drive means transmitting motion from the spindle to the tool, and immobilizing and centering means situated in a radially intermediate position, between said drive means and said fastening and tightening means, wherein the fastening and tightening means are conformed to lift the tool towards the spindle during tightening by bearing up under a corresponding conformation of the tool.

2. The machine as claimed in claim 1, wherein the drive spindle is a rotational drive spindle and the drive means comprises positive clutch wheels.

3. The machine as claimed in claim 1, further comprising sequential control means for translationally approaching the spindle about said axis for centering and immobilizing, then for meshing of the drive means, then for fastening and tightening the tool.

4. An automatic tool changing device for milling, surfacing and polishing machines, comprising a first element fixed to a tool-holding spindle, a second element permanently fixed to a sliding block, and a third fastening and tightening element fixed to the tool destined to be mounted onto the sliding block, in which is rotatably mounted a driving element of the tool, wherein the second and third elements respectively fixed to the sliding block and the tool comprise a hydraulic tightening means engaging and bearing up under a corresponding conformation of the tool, and wherein the fastening and tightening third element fixed to the tool comprises at least two centering pins, and an outer flange for tightening.

5. The device as claimed in claim 4, wherein the fastening and tightening element fixed to the tool comprises three centering pins, so as to achieve a plane-to-plane type contact and perfect sustaining during tightening.

6. The device as claimed in claim 4, wherein the first element fixed to the tool-holding spindle and the driving element of the tool are hollow so as to enable a hydraulic fluid to pass through.

7. The device as claimed in claim 4, wherein the first element fixed to the tool-holding spindle comprises a positive clutch wheel, and the driving element of the tool comprises a positive clutch gear of cooperating shape.

8. The machine as claimed in claim 1, wherein the tool is a rotatable tool for removing material from a work-piece.

9. The device as claimed in claim 4, wherein the tool is a rotatable tool for removing material from a work-piece.

* * * * *